(12) United States Patent
Fee

(10) Patent No.: US 6,285,475 B1
(45) Date of Patent: Sep. 4, 2001

(54) METHOD AND SYSTEM FOR DETECTING OPTICAL FAULTS IN A NETWORK FIBER LINK

(75) Inventor: John Arthur Fee, Plano, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/582,845

(22) Filed: Dec. 29, 1995

(51) Int. Cl.[7] .................................................. H04B 10/08
(52) U.S. Cl. ........................................... 359/110; 359/117
(58) Field of Search .................................... 359/110, 125, 359/118, 128, 137, 139, 117, 123, 115; 370/352, 376, 388, 395

(56) References Cited

U.S. PATENT DOCUMENTS

| | | | |
|---|---|---|---|
| 4,451,916 | 5/1984 | Casper et al. | 370/16 |
| 4,527,270 | 7/1985 | Sweeton | 371/11 |
| 4,542,502 | 9/1985 | Levinson et al. | 370/88 |
| 4,560,246 | 12/1985 | Cotter . | |
| 4,561,119 | 12/1985 | Epworth . | |

(List continued on next page.)

FOREIGN PATENT DOCUMENTS

| | | |
|---|---|---|
| 0359352 A3 | 3/1990 | (EP) . |
| 0449475 A2 | 10/1991 | (EP) . |
| 0 507 379 | 10/1992 | (EP) . |
| 0 620 694 A2 | 10/1994 | (EP) . |
| 0 721 275 A2 | 7/1996 | (EP) . |
| 2 233 851 | 1/1991 | (GB) . |

OTHER PUBLICATIONS

Patent Abstracts of Japan, vol. 095, No. 001, Feb. 28, 1995, JP 06 291739 A, Oct. 18, 1994.
Patent Abstracts of Japan, vol. 12, No. 423, JP 63 160436 A, Jul. 4, 1988.
Hill et al., "A Transport Network Layer Based on Optical Network Elements," *Journal of Lightwave Technology*, vol. 11, No. 5/6, May/Jun. 1993, pp. 667–676.
Aida et al., "Optical Protection Switches for Trunk Transmission Systems," IEEE International Conference on Communications '88, vol. 1, Jun., 1988, pp. 1–5.
Brooks et al., "An optical fibre supervisory sub–system employing an entirely optical telemetry path," European Conference on Optical Communication, Sep., 1982, pp. 400–405.

(List continued on next page.)

Primary Examiner—Rafael Bacares

(57) ABSTRACT

A method and system for detecting optical faults by tapping a portion of a data signal from along a fiber network link at an optical switching site or node. The tapped data signal is evaluated to determine whether an optical fault exists along the fiber link. In this way, optical faults such as a fiber failure, cable cut, or nodal LTE failure occurring within a network path, are isolated to a specific fiber span or link. Network switch controllers can then take full advantage of optical switches provided between spans in an all-optical core network to restore end-to-end path communication. In one embodiment, a presence detector simply evaluates the magnitude of the tapped signal to determine an optical fault. In a second embodiment, a protocol analyzer evaluates selected bits or fields of the protocol used in the tapped data signal to determine an optical fault. Finally, in a third embodiment, a sub-carrier modulation signal is added to the high rate data signal prior to transport over the link. The subcarrier signal is significantly lower in both frequency and amplitude than the main data signal so as to not impact reliable reception of the main data signal. A low-pass filter tuned to the sub-carrier modulation signal filters the tapped data signal. By detecting the sub-carrier signal, fault can be determined inexpensively and reliably in the presence of optical noise.

33 Claims, 11 Drawing Sheets

U.S. PATENT DOCUMENTS

| | | | |
|---|---|---|---|
| 4,596,982 | 6/1986 | Bahr et al. | 340/825.05 |
| 4,704,714 | 11/1987 | Tomizawa et al. | 370/15 |
| 4,745,597 | 5/1988 | Morgan et al. | 370/87 |
| 4,763,315 | 8/1988 | Nakayashiki et al. | 370/16 |
| 4,768,190 | 8/1988 | Giancarlo | 370/86 |
| 4,797,589 | 1/1989 | Collins | 370/63 |
| 4,821,255 | 4/1989 | Kobrinski | 370/3 |
| 4,831,662 | 5/1989 | Kuhn | 455/608 |
| 4,845,736 | 7/1989 | Posner et al. | 379/27 |
| 4,866,699 | 9/1989 | Brackett et al. . | |
| 4,887,256 | 12/1989 | Nakayashiki et al. | 370/16 |
| 4,956,835 | 9/1990 | Grover . | |
| 4,964,095 | 10/1990 | Tyrrell et al. | 370/55 |
| 5,058,105 | 10/1991 | Mansour et al. | 370/16 |
| 5,069,521 | 12/1991 | Hardwick | 385/24 |
| 5,081,452 | 1/1992 | Cozic | 340/825.5 |
| 5,091,902 | 2/1992 | Chopping et al. | 370/16.1 |
| 5,166,821 | 11/1992 | Huber . | |
| 5,179,548 | 1/1993 | Sandesara | 370/16.1 |
| 5,182,744 | 1/1993 | Askew et al. | 370/16 |
| 5,200,964 | 4/1993 | Huber . | |
| 5,218,465 | 6/1993 | Lebby et al. | 359/110 |
| 5,271,075 | 12/1993 | Gfeller et al. | 385/20 |
| 5,299,293 | 3/1994 | Mestdagh et al. | 359/110 |
| 5,301,050 * | 4/1994 | Czerwic et al. | 359/110 |
| 5,303,078 * | 4/1994 | Brackett et al. | 359/139 |
| 5,327,427 | 7/1994 | Sandesara | 370/85.14 |
| 5,329,392 | 7/1994 | Cohen | 359/124 |
| 5,329,396 | 7/1994 | Fishman et al. . | |
| 5,329,520 | 7/1994 | Richardson | 370/16 |
| 5,333,130 | 7/1994 | Weissmann et al. | 370/16 |
| 5,341,364 | 8/1994 | Marra et al. | 370/16.1 |
| 5,343,464 | 8/1994 | Iino et al. | 370/16 |
| 5,359,450 | 10/1994 | Ramachandran et al. . | |
| 5,365,510 | 11/1994 | Nicholson et al. | 370/16 |
| 5,373,383 | 12/1994 | LaGasse . | |
| 5,373,385 | 12/1994 | Darcie et al. . | |
| 5,396,357 | 3/1995 | Goossen et al. | 359/119 |
| 5,420,868 | 5/1995 | Chraplyvy et al. . | |
| 5,434,691 | 7/1995 | Yamane | 359/117 |
| 5,436,890 * | 7/1995 | Read et al. | 370/58.2 |
| 5,442,472 | 8/1995 | Skrobko | 359/110 |
| 5,442,623 | 8/1995 | Wu | 370/16.1 |
| 5,446,725 | 8/1995 | Ishiwatari | 370/16.1 |
| 5,452,115 | 9/1995 | Tomioka | 359/123 |
| 5,457,555 | 10/1995 | Moriyama | 359/110 |
| 5,457,556 * | 10/1995 | Shiragaki | 359/117 |
| 5,459,715 | 10/1995 | Furuta et al. | 370/16 |
| 5,479,608 | 12/1995 | Richardson | 395/182.02 |
| 5,495,471 | 2/1996 | Chow et al. | 370/16 |
| 5,517,489 | 5/1996 | Ogura | 370/16.1 |
| 5,555,477 * | 9/1996 | Tomooka et al. | 359/115 |
| 5,602,828 | 2/1997 | Engdahl et al. | 370/228 |
| 5,625,478 | 4/1997 | Doerr et al. | 359/125 |
| 5,647,035 | 7/1997 | Cadeddu et al. | 385/24 |
| 5,663,820 * | 9/1997 | Shiragaki | 359/128 |
| 5,673,142 * | 9/1997 | Fatehi et al. | 359/341 |
| 5,680,235 | 10/1997 | Johansson | 359/110 |

OTHER PUBLICATIONS

Chao et al., "FASTAR—A Robust System for Fast DS3 Restoration," *Globecom '91*, 1991, pp. 1396–1400.

Elrefaie, "Multiwavelength Survivable Ring Network Architectures," IEEE International Conference on Communications '93, vol. 2, May, 1993, pp. 1245–1251.

Jensen et al., "Novel technique for monitoring long–haul undersea optical–amplifier systems," *Optical Fiber Communication*, vol. 4, Feb., 1994, pp. 256–257.

Park, E. et al., "Simultaneous All–Optical Packet–Header Replacement and Wavelength Shifting for Dynamically–Reconfigurable WDM Network," *IEEE Photonics Technology Letters*, vol. 7, No. 7, Jul., 1995, pp. 810–812.

Riaziat, M. L. et al., "Optical Wavelength Shifting by Traveling–Wave Electrooptic Modulation," *IEEE Photonics Technology Letters*, vol. 5, No. 9, Sep. 1993, pp. 1002–1005.

Wagner et al. , "Multiwavelength Ring Networks for Switch Consolidation and Interconnection," Supercomm/International Conference on Communications, vol. 3, pp. 1173–1179 (Jun. 1992).

Wehr, M. "Wavelength division multiplexing in transmission networks," *Commutation & Transmission*, vol. 17, No. 2, pp. 29–34 (1995).

Zhou, J. et al., "Four–Wave Mixing Wavelength Conversion Efficiency in Semiconductor Traveling–Wave Amplifiers Measured to 65 nm of Wavelength Shift," *IEEE Photonics Technology Letters*, vol. 6, No. 8, Aug., 1994, pp. 984–987.

Yamabayahi et al., "Supervisory Signal Transmission by Modulating The mB1C Code Complementary Bit," *IEEE: Journal of Lightwave Technology*, vol. 9, No. 3, Mar. 1991, pp. 381–385.

Matsuoka et al., "Supervisory Signal Transmission Methods For Optical Amplifier Repeater Systems," *IEEE*, (1990), pp. 1846–1850.

Murakami et al., "A Remote Supervisory System Based on Subcarrier Overmodulation for Submarine Optical Amplifier Systems," *IEEE: Journal of Lightwave Technology*, vol. 14, No. 5, May 1996, pp. 671–677.

Hadjifotiou et al., "Supervisory Options For Fibre Optical Amplifier Systems," Fourth I.E.E. Conference on Telecommunication, Conference Publication No. 371, Apr. 8, 1993, pp. 53–56.

Bhagavathk, Vijay K., "Reliability Evaluation and Protection Schemes for Dense WDM Network Architectures," 92CH3132 I.E.E.E., pp. 0174–0178 (1992).

Brackett, C., "Dense Wavelength Division Multiplexing Networks: Principles & Applications," I.E.E.E. Journal on Selected Areas in Communications, vol. 8, No. 6, pp. 948–664 (Aug. 1990).

DeMeis, R., "Select the Right Test Equipment for Your Fiber Optic Needs," Laser Focus World, pp. 161–173 (Oct. 1995).

Green, P., Fiber Optic Networks, Prentice Hall, pp. 7–10 (1993).

Grover, Wayne Ph.D., "Distributed Restoration of the Transport Network," Network Management into the 21st Century, Chapter 11, IEEE Press, p. 337.

Hecht, Jeff., "Push is on for Multiwavelength Optical Networks," Laser Focus World, pp. 59–61 (Oct. 1995).

Minoli, D., "Telecommunications Technology Handbook," Artech House: Norwood, MA, chptrs. 3 and 7 (1995).

Spirit, D.M. et al., eds. High Capacity Optical Transmission Explained, John Wiley & Sons, West Sussex, England, chptrs. 1, 6 and 7 (1995).

Waynant et al., "Optical Integrated Circuits," Electro–Optics Handbook, (McGraw–Hill, Inc., USA), chpt. 26, pp. 26.1–26.39 (1994).

Wu, T., "Emerging Technologies for Fiber Network Survivability," IEEE Communications Magazine, pp. 58–74, (Feb. 1995).

Wu, T. et al., "Strategies and Technologies for Planning a Cost–Effective Survivable Fiber Network Architecture Using Optical Switches," CH2655–9 IEEE, pp. 749–755, (1989).

* cited by examiner

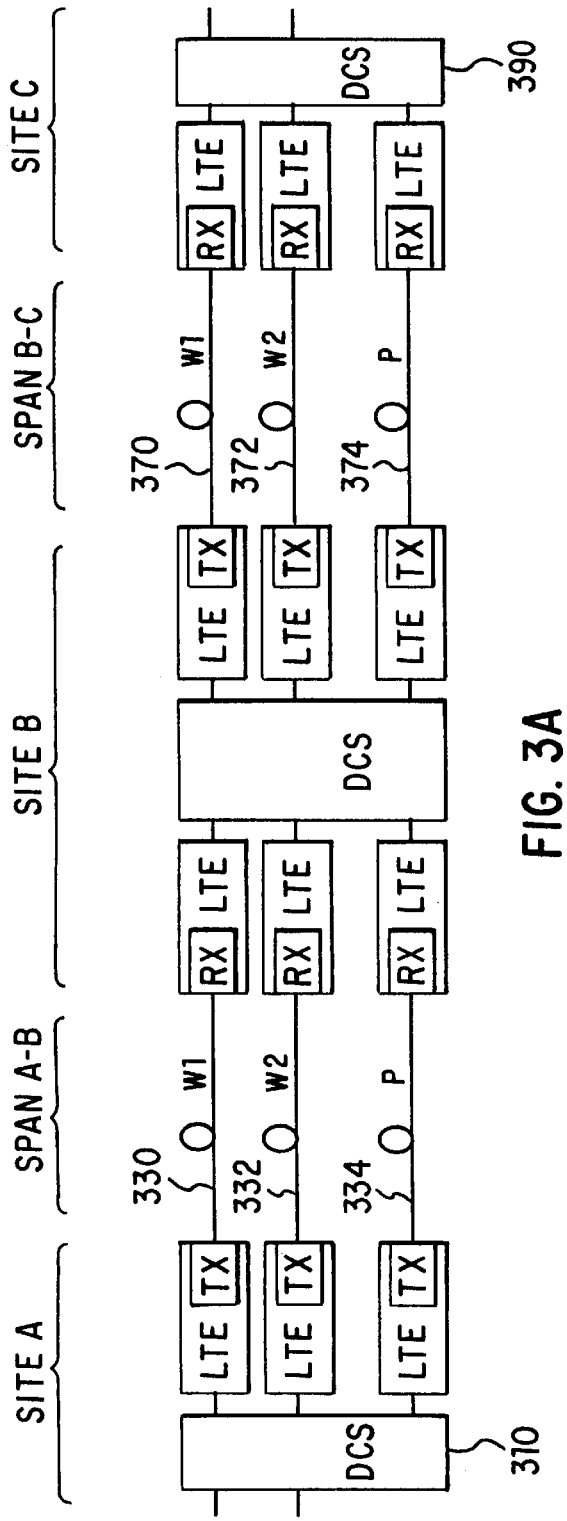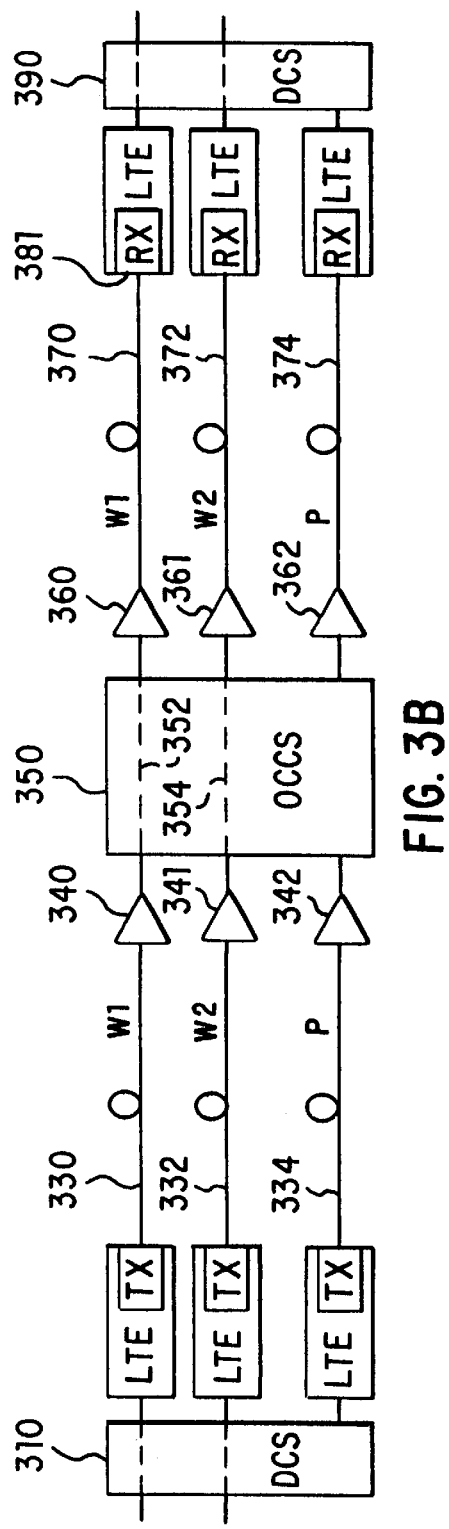
FIG. 3A
FIG. 3B

METHOD AND SYSTEM FOR DETECTING OPTICAL FAULTS IN A NETWORK FIBER LINK

BACKGROUND OF THE INVENTION

1. Cross Reference to Related Applications

This patent application is potentially related to the following commonly owned, copending applications:

1. "Method and System for Detecting Optical Faults Within the Optical Domain of a Fiber Communication Network," Ser. No. 08/582,845 by Shoa-Kai Liu, filed on Dec. 28, 1995, and incorporated herein by reference;

2. "System and Method for Photonic Facility and Line Protection Switching," Ser. No. 08/577,663 by John A. Fee, filed on Dec. 22, 1995, and incorporated herein by reference; and 3. "Method and System for Restoration Tributary Switching in a Fiber Network," Ser. No. 08/582,846 by John A. Fee, filed concurrently herewith, and incorporated herein by reference.

2. Field of the Invention

The present invention relates to an optical communication network. More specifically, this invention relates to a system and method for detecting optical faults within a network.

3. Related Art

A communication network serves to transport information among a number of locations. The information is usually presented to the network in the form of time-domain electrical signals and may represent any combination of telephony, video, or computer data in a variety of formats. A typical communication network consists of various physical sites, called nodes, interconnected by information conduits, called "links." Each link serves to carry information from one site to another site. Individual sites contain equipment for combining, separating, transforming, conditioning, and/or routing data.

The traffic of even a single link represents a formidable volume of vital data-equivalent to tens of thousands of phone calls. Sudden failure of a data link can cause a significant loss in revenues for a network owner and loss of commerce and other benefits for the network subscribers. Consequently, restoration techniques have been devised to circumvent a network link failure and to restore normal traffic flow soon.

FIG. 1 shows an example of a typical communications network 100 consisting of sites 101–105 connected by links 120–121. Links are generally implemented using electrical cables, satellites, radio or microwave signals, or optical connections and can stretch for tens or hundreds of miles between sites. Through these links, the communications system 100 carries data signals among the sites 101–105 to effectively interconnect data remote equipments 111–115, i.e. computers, remote terminals, servers, etc. One or more links 120 and 121 that connect two sites are collectively referred to as a span 130.

A span often includes multiple parallel links to increase working and spare capacity. Redundant spare links are commonly added between sites with the intent that they usually carry no data traffic but are available as alternate routes in the event of partial network failure affecting working links. If the network detects a link failure such as a fiber failure, cable cut, or transmitter/receiver nodal failure, traffic may be automatically switched from the failed link to an available spare link.

A typical implementation of a high data rate optical span is depicted in FIG. 2. In FIG. 2, a given site A is connected to another site B by a span consisting of three optical fibers 230,232,234. Two electrical data signals are presented at Site A via inputs 202 and 204. These signals are carried through the network span and recovered at Site B as electrical signal outputs 262 and 264 respectively. For example, these data signals can be STS-48 synchronous data signals each bearing digital data at about 2.5 Gbps or the equivalent of 32 thousand telephone-quality voice channels.

At Site A, the signals enter a digital cross-connect switch 210, and under normal conditions appear as electrical signals along connections 212 and 214. The signal at connection 212 enters an optical Lightwave or Line Terminal Equipment (LTE) 220 shown to include an optical transmitter 221, such as a semiconductor laser. Light emitted by the transmitter 221 is intensity-modulated by the electrical data signal that enters along connection 212 to deliver a modulated optical output signal over optical fiber 230.

After traversing the length of fiber 230, the optical signal arrives at Site B and enters a receiver 241 such as a photodiode. The receiver 241 is shown to be a part of an LTE 230 that amplifies and conditions the signal to render a faithful electrical reproduction at output port 252 of the original electrical data signal provided at input 202. In a similar manner, an electrical data signal presented at input 204 is transported by LTE 222, fiber 232, and LTE 242 to output port 254.

Under normal circumstances, the digital cross-connect switch DCS 260 simply connects port 252 to output port 262 to complete the end-to-end connection of input 202 to output 262. Likewise, DCS 260 normally connects line 254 to output 264 to complete the end-to-end connection of input 204 to output 264.

In FIG. 2, fibers 230 and 232 are referred to as working fibers because they both carry data traffic when all network elements are functioning properly. In contrast, fiber 234 is said to be a spare or "protect" fiber because it carries data traffic only in the event of failure of one of the working fibers 230 or 232 or of the associated LTEs 220, 222, 240, 242. Under normal circumstances, protect fiber 234 does not carry an optical data signal.

When a failure occurs along one of the working fibers 230, 232, digital cross-connect switches 210 and 260 switch data traffic onto the protect fiber 234. For example, if fiber 230 becomes too damaged to transmit light, switch 210 connects input 202 to connection 216. At the same time, DCS 260 disconnects connection 252 and connects output port 262 to connection 256. This switching action restores end-to-end connectivity between input 202 and output 262 despite the failure of working fiber 230.

To successfully perform restoration switching, however, it is necessary to detect failures and to coordinate switching action at each node. As shown in FIG. 2, a separate digital communication network is provided between sites for signaling status and switching commands between DCS 220 and DCS 260. Controller 250 is assigned to Site A to accept alarm inputs 255 from LTE's 220, 222, and 224. Controller 250 also directs the switching action of DCS 210 via control connection 253. A similar Controller 252 resides at Site B to accept alarm inputs 256 from LTEs 240,242, and 244 and to exercise control over DCS 260 via control connection 254. Each Controller 250, 252 is typically an imbedded microprocessor, computer, workstation, or other type of processor for controlling the switching of lightwave terminal equipment, digital cross-connect switches, and optical cross-connect switches.

Controllers 250 and 252 communicate and coordinate with each other over a separate communications link 251.

For example, status messages can be sent to indicate, acknowledge, or confirm a link or node state such as an idle, active, inactive, or detected fault state. Any digital signaling protocol can be used such as X.25, Frame Relay, ATM, B-ISDN or Common Channel Signaling 7 protocols. Alternatively, controllers 250 and 251 can communicate status messages using overhead bits or bytes within the data protocol that traverses the working fibers. Restoration algorithms and protocols applied within the controllers to restore end-to-end connectivity in response to a fault detection are well known to those skilled in the art.

Thus, the ability to restore network service depends upon the ability to detect and locate failed network components. Faults have been detected in the electrical domain at LTEs. A transmitter 221 can detect a failed laser diode, for example, by monitoring its bias current. Some transmitters also incorporate a backwave detector. This is a photodiode that picks up the light emerging from the back of the laser diode and can detect the loss of laser output.

A laser diode failure within transmitter 221 can cause LTE 220 to report an alarm condition along an alarm connection 255 to the controller 250. The controller 250 can then direct switching of signals from port 221 to port 216. The controller 250 can also send signals along line 251 to controller 252 at Site B to cause switch 260 to connect port 256 to output port 262.

A receiver 241 can detect the presence of light delivered through fiber 230. A receiver 241 may also monitor bias current of a photodiode, if so equipped. Breakage of fiber 230 or failure of receive element 241 can cause LTE 240 to generate an alarm signal along an alarm connection 256 to controller 252. The controller 252 may then directly control switch 260 and indirectly control switch 210 to circumvent the failed fiber 230 or failed receiver 241.

Another way to detect signal presence at the receive end is by the use of a protocol analyzer that looks for specific data patterns, for example data frame alignment bits, in the digital electrical signal. This detection is usually inherent in the course of handling such signals in the electrical domain. Therefore, LTE 240 could also generate a "loss of frame" alarm to controller 252.

With reference now to FIGS. 3A–3D, the description of operation provided for elements in FIG. 2 applies to the like elements in FIG. 3A–3D. The alarm and controller elements are purposely omitted from the drawing for the sake of clarity.

FIG. 3A is an expansion of FIG. 2 to encompass another span B-C connected to site C. Electrical DCS switches 310,390 are provided at respective endpoint sites A,C. Traffic between sites A and C travels through an intermediate optical/electronic site B. Spans A-B and B-C interconnect the sites as shown. Span A-B includes working fibers 330,332 and protect fiber 334. Span B-C includes working fibers 370,372 and protect fiber 374. Thus, FIG. 3A illustrates the common practice of performing optical-electrical-optical conversion at each site.

In contrast, FIG. 3B represents the more recent, preferred approach of performing more data signal handling in the optical domain. Compared to conventional optical-electronic switching, spans A-B and B-C are optically interconnected at site B. FIG. 3B shows that an entire set of LTEs and a DCS at site B have been replaced by an optical cross connect switch (OCCS) 350 and several optical amplifiers 340–342 and 360–362. Note that the approach of FIG. 3B requires less equipment and removes the intrinsic data rate limitations imposed by intermediate electrical equipment.

The optical switch 350 is capable of being controlled in the same way as the digital cross-connects. An electrical control signal (or an optical control signal) drives the optical switch to selectively form optical connections among various input and output ports facing optical fibers 330–334, 370–374. For example, internal connections 352 and 354 within the OCCS 350 optically couple respective working fibers 330,332,370,372 in both spans A-B, B-C under normal network conditions as shown in FIG. 3B. The optical amplifiers 340–342, 360–362 intensify the lightwave signal and compensate for losses introduced by the working and protect fibers and the OCCS 350.

While the approach of FIG. 3B is advantageous and represents the current trend towards implementing all-optical networks, a new problem is introduced in reliably detecting and locating failures. Without the receivers and LTE's at Site B, it is no longer possible to detect failure along fiber 330 as distinct from failure along fiber 370. In particular, lightwave terminal equipment located at the endpoints of optically interconnected spans cannot distinguish which span causes a communication failure. Therefore, the optical switching function within Site B cannot be usefully employed to bypass failed elements.

This problem is even better understood by examining FIGS. 3C and 3D. In FIG. 3C, fiber 330 has been cut. This failure is detected by receiver 381 at site C. Without a separate detection at intermediate node B, however, the failure cannot be pinpointed to fiber 330 or fiber 370. Any controller receiving an alarm from receiver 381 at an endpoint node must assume that both fibers 330 and 370 have failed.

Restorative switching on a path basis between endpoints can be performed through DCS switches 310 and 390 as shown. For purposes of line protection switching and restoration, this recovery scheme leaves optical switch 350 no more useful than straight permanent connections. This amounts to what is called path protect switching in that entire paths between endpoint sites are switched. The problem is exacerbated as more working and spare fibers are taken into account.

Proper switching of OCCS 350 can provide a greater number of restoration paths. For example, compound failures as depicted in FIG. 3D can be restored. Such versatile restoration line switching can only occur when fault detection capability is provided at Site B to distinguish span A-B failures from span B-C failures.

What is needed is a method and system for detecting optical faults along a fiber network link. Reliable fault detection needs to occur at or near intermediate optical switching sites without impeding data communication traffic. Any detected problems in an all-optical switching network path must be isolated to a specific fiber span or link.

SUMMARY OF THE INVENTION

The present invention provides a method and system for detecting optical faults along a fiber network link by tapping a portion of a data signal from the link at or near an optical switching site. The tapped data signal is evaluated to determine whether an optical fault exists along the fiber link. In this way, network faults such as a fiber failure, cable cut, or nodal LTE failure, are isolated to a specific fiber span or link. An intermediate optical switch coupled to the link can then be switched independently to avoid communication through the particular failed link. Network node controllers can then take full advantage of optical switches provided between spans in an all-optical core network to restore end-to-end path communication.

A lightwave receiver, such as a photodiode, is optically coupled to receive the tapped fraction of the data traffic. Optical fault detection can be conducted at an intermediate site in an all-optical core network yet minimal signal loss is imparted to the data traffic.

In one embodiment of the present invention, a presence detector simply evaluates the magnitude of the tapped signal to determine an optical fault.

In a second embodiment, a protocol analyzer evaluates selected bits or fields of the protocol used in the tapped data signal to determine an optical fault. By evaluating the protocol, fault can be determined reliably even for low-magnitude signals. In this way, only a relatively small fraction of the data signal must be tapped for purposes of fault detection compared to the first embodiment.

Finally, in a third embodiment a sub-carrier modulation signal is added to the high rate data signal prior to transport over the link. A low-pass filter tuned to the sub-carrier modulation signal is used to filter the tapped data signal. By detecting the sub-carrier signal, fault can be determined reliably and inexpensively.

For example, in the third embodiment, a monitoring subcarrier signal modulated at or about 1 to 10 MHZ is linearly added to an incident high data rate signal such as an OC-192 modulated at approx. 10 GHz. The composite of these two signals is used to intensity modulate an optical transmitter for the link. The monitoring subcarrier signal is significantly lower in both frequency and amplitude than the main data signal so as to not impact reliable reception of the main data signal.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention. In the drawings:

FIGS. 3A to 3D each illustrate a portion of an optical network showing the role of intermediate optical cross connect switches.

FIG. 4A shows the detection of the presence or absence of a tapped optical signal without noise. FIG. 4B shows the detection of a tapped optical noise signal misinterpreted as the presence of a valid optical data signal.

FIG. 6A shows the detection of the presence or absence of a tapped sub-carrier modulated optical signal without noise. FIG. 6B shows the detection of the absence of a sub-carrier modulated optical signal despite the presence of noise.

Figure 1:
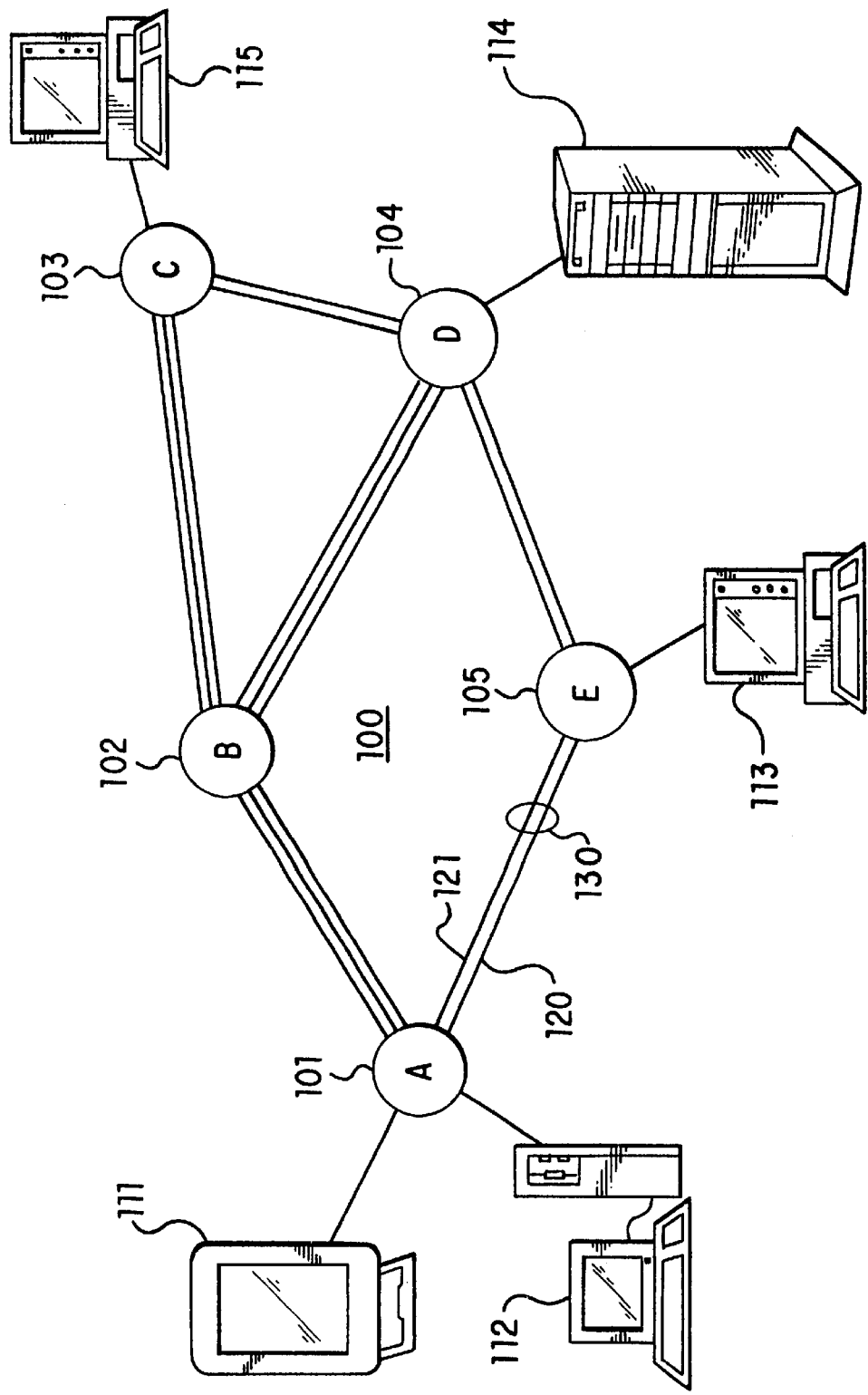
FIG. 1 is an illustration of a typical communications network.

The present invention will now be described with reference to the accompanying drawings. In the drawings, like reference numbers indicate identical or functionally similar elements. Additionally, the left-most digit(s) of a reference number typically identifies the drawing in which the reference number first appears.

DETAILED DESCRIPTION OF THE FIGURES

Overview

The present invention detects optical faults by tapping a portion of a data signal from along a fiber link in an optical switching network. The tapped data signal is evaluated to determine whether an optical fault exists along the fiber link. In this way, optical faults such as a fiber failure, cable cut, or nodal LTE failure occurring within a network path, are isolated to a specific fiber span or link. Versatile optical switching can occur between spans in an all-optical core network to restore end-to-end path communication.

In one embodiment, a presence detector simply evaluates the magnitude of the tapped signal to determine an optical fault. In a second embodiment, a protocol analyzer evaluates selected bits or fields of the protocol used in the tapped data signal to determine an optical fault.

Finally, in a third embodiment, a sub-carrier modulation signal is added to the high rate data signal prior to transport over the link. The subcarrier signal is significantly lower in both frequency and amplitude than the main data signal so as to not impact reliable reception of the main data signal. A low-pass filter tuned to the sub-carrier modulation signal filters the tapped data signal. By detecting the sub-carrier signal, fault can be determined reliably and cheaply.

Example Environment

The present invention is described in the example environment of a fiber optic communication network. In particular, fault detection along a long-distance fiber optic link in an all-optical switching network is considered. Description in these terms is provided for convenience only. It is not intended that the invention be limited to application in this example environment. In fact, after reading the following description, it will become apparent to a person skilled in the relevant art how to implement the invention in alternative environments.

First Embodiment

Figure 2:
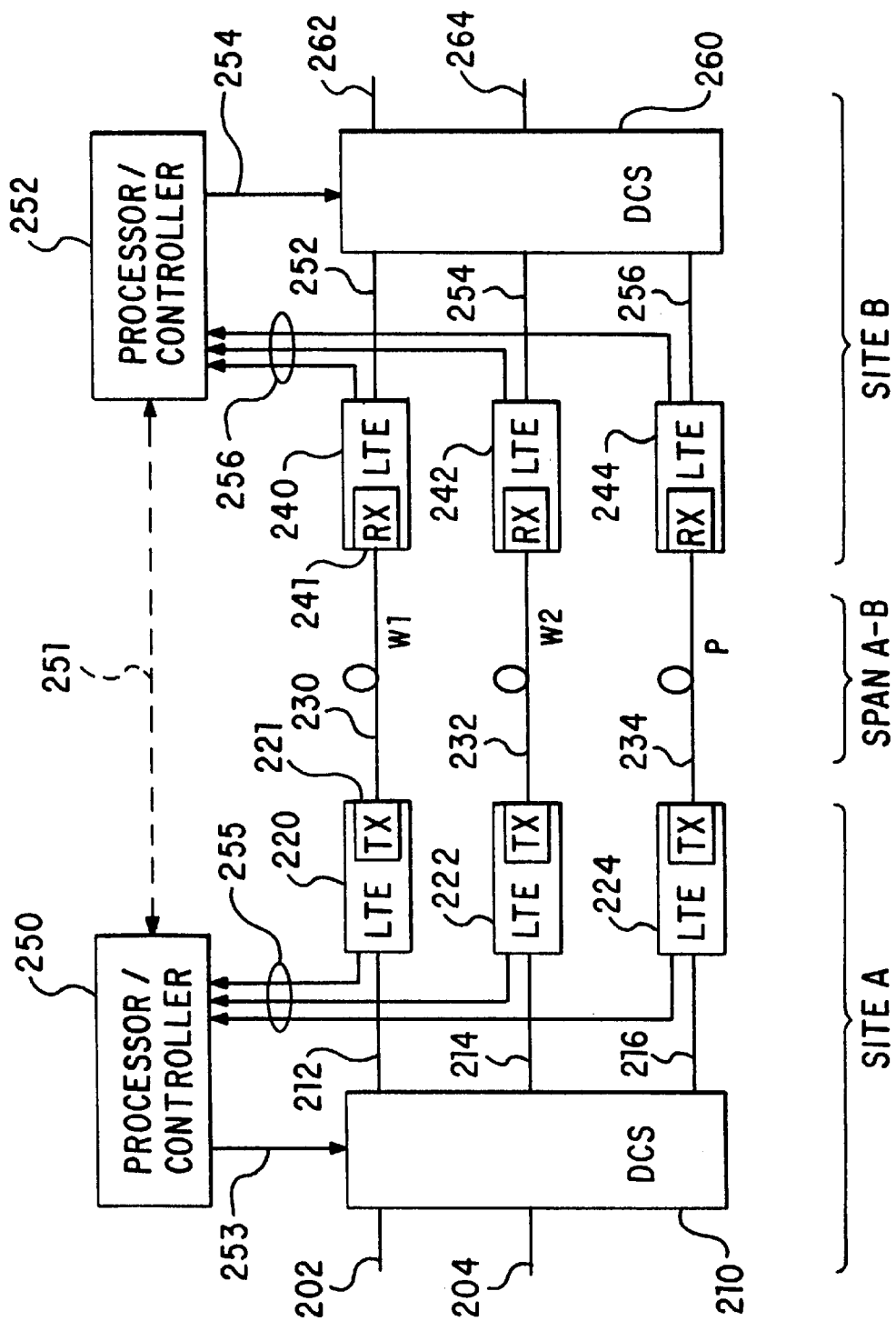
FIG. 2 is a block diagram of the electrical and optical components employed in an optical data communications span.
Figure 3C:
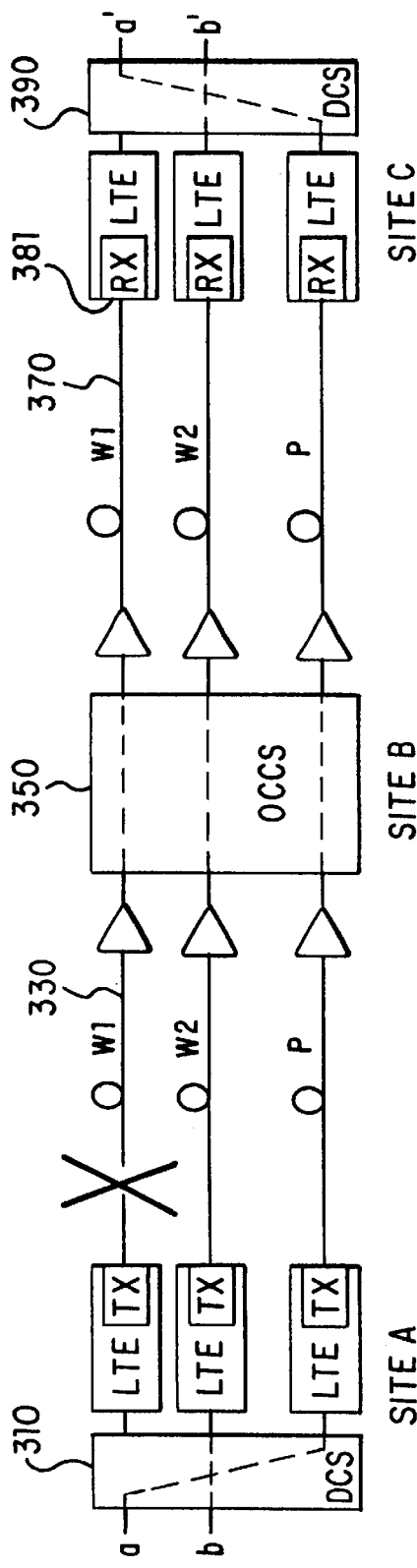
Figure 3D:
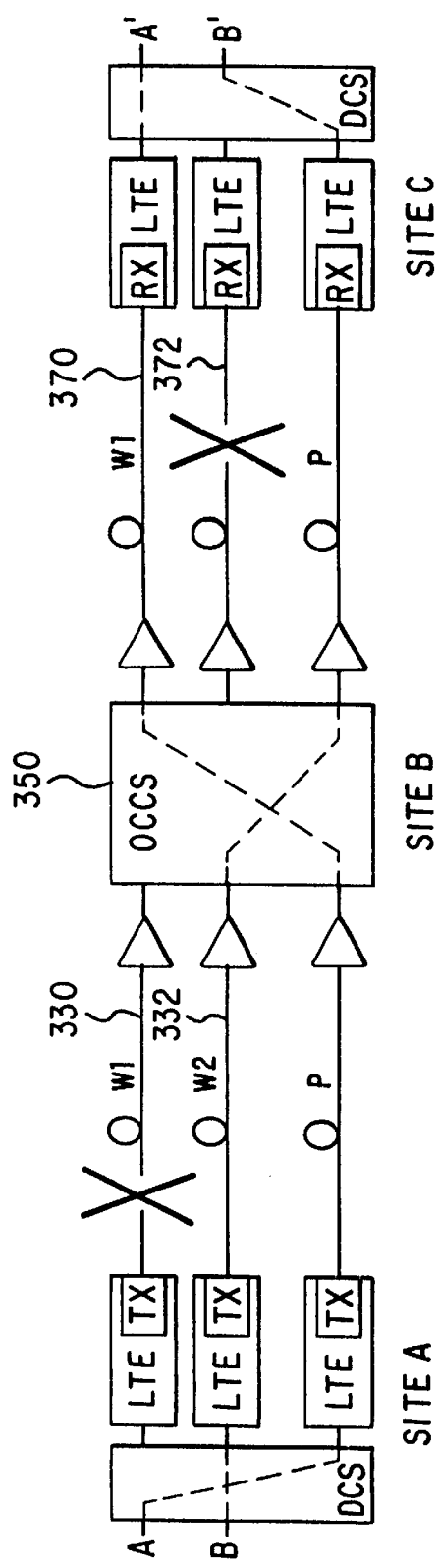
Figure 4A:
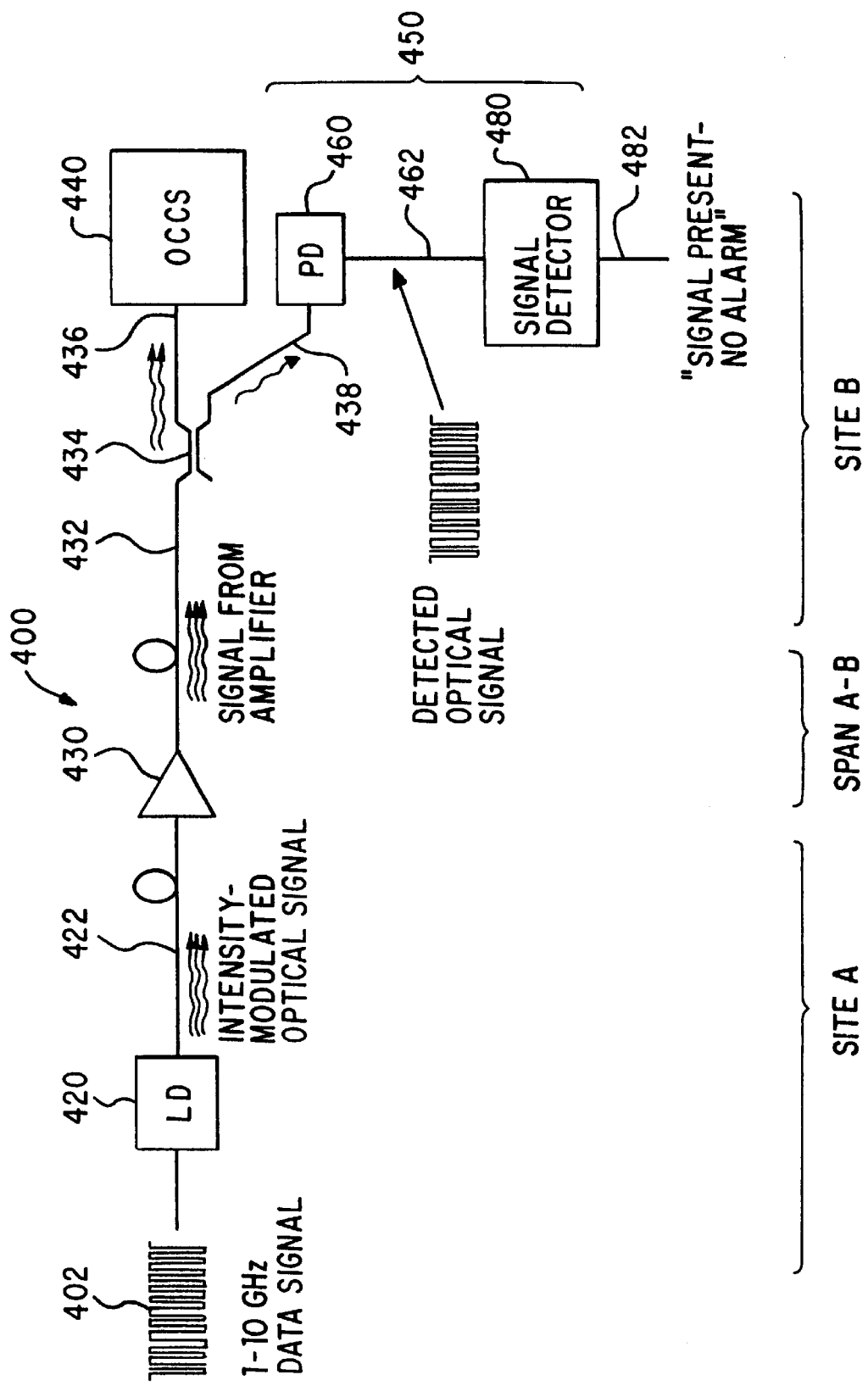
FIGS. 4A and 4B are block diagrams of a fault detection technique using a signal detector in accordance with a first embodiment of the present invention.
Figure 4B:
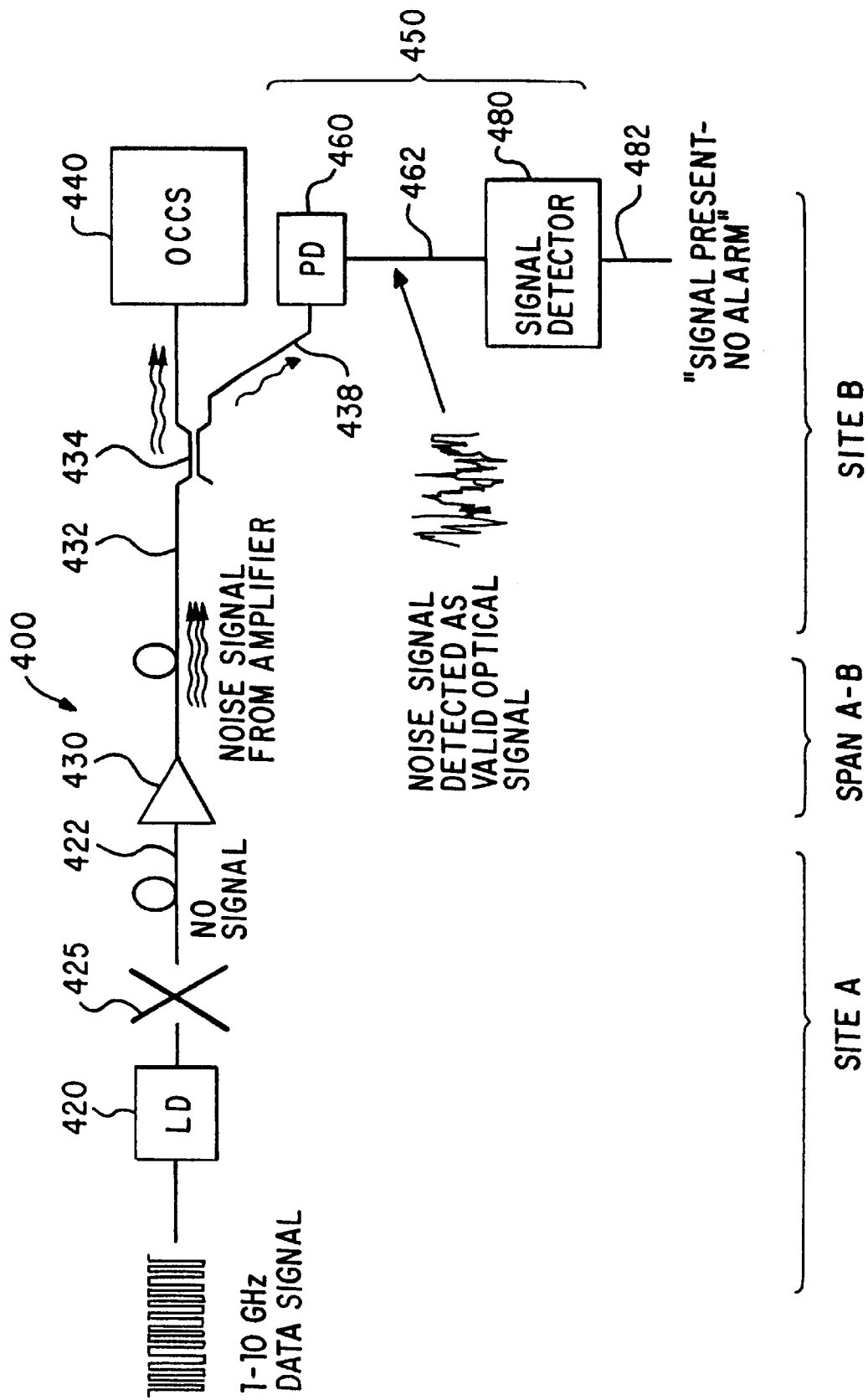

FIGS. 4A and 4B are block diagrams of a network link fault detection technique using a signal detector in accordance with a first embodiment of the present invention. FIG. 4A shows the detection of the presence or absence of a tapped optical signal without noise along a fiber link 400. Fiber link 400 is included in a long-distance span A-B connecting sites A and B. Multiple working/and or spare links can be added. For further clarity, only one endpoint site A and an intermediate site B are shown for the network. Additional interconnected sites can be linked through spans to sites A and B as described with respect to FIGS. 1 to 3 to expand the network. Thus, fiber link 400 constitutes a segment of one or more paths between network endpoint sites. In an all-optical core network, data is switched optically at intermediate nodes such as site B, and injected and recovered from the network in lightwave terminal equipment at the endpoint sites, such as site A.

At site A, a laser diode 420 is driven at a high data rate by a 1–10 GHz data signal 402 to produce an intensity modulated optical data signal, i.e. an Optical Carrier OC-192 signal. In general, any type of high data rate modulated optical source can be used, such as an integrated-type of direct modulated laser or an externally modulated laser, depending upon the required performance, cost, and other known design considerations.

The modulated optical signal is transported over fiber link 400 in span A-B to site B. After traveling a considerable distance, the signal may be strengthened by an optical amplifier 430 (or a lightwave re-generator) and further sent along fiber 432. Multiple optical amplifiers can be spaced along a fiber link to increase range.

The modulated optical data signal carried through fiber 432 eventually reaches an optical cross-connect switch 440 at a distant site B. Because the OCCS is located at an intermediate site or node, OCCS 440 can switch optical connections between multiple working and/or spare fibers as described earlier with respect to OCCS 350.

OCCS 440 can be any type of multi-port optical cross-connect switch. In principle for a N×N OCCS any number of ports, e.g. N=1, 2, 4, 8, 16, 40, 72, 128, or 256, can be switched. Any type of optical switch can be used depending upon the available technology. See, e.g., the integrated lithium niobate directional-coupler type switches discussed by Waynant, R. et al., Eds., *Electro-Optics Handbook*, McGraw-Hill, Inc. U.S.A. (1994), chapter 26, and especially page 26.34 (incorporated herein by reference). Other types of suitable optical switching technology include switches based on a thermo-optic effect in polymer waveguides or silica glass, semiconductor amplification, piezo movement, and integrated indium phosphide.

In addition, while a single OCCS 440 is shown schematically for clarity, multiple discrete switches and couplers can be used to perform equivalent multiple-port optical switching. For example, a set of discrete 1×2 or 2×2 optical switches can used to switch individual signals between working and protect fibers in different spans. Y-couplers and directional couplers can also be used.

According to the present invention, an optical coupler 434 is provided for coupling a portion of the modulated optical data signal from optical fiber 432 through fiber 438 to a fault detection receiver 450. For example, a tapped optical coupler (e.g. 90/10 2×2 asymmetric coupler) can be used to tap a fraction of the optical signal. It is desirable that most of the optical signal continue along fiber 436 to switch 440 in order to assure reliable reception at a remote LTE receiver.

In the first embodiment, receiver 450 includes a photodiode 460 for detecting the tapped optical data signal. A fast, responsive photodiode 460 produces an electrical signal 462 representative of the tapped optical data signal received from fiber 438 which is provided to a signal detector processor 480. For example, signal detector processor 480 can comprise any combination of rectifier, low-pass filter, thresholding, comparator, and hysteresis circuitry. The output of signal detector processor 482 indicates whether photodiode 460 is receiving any optical signal.

When the fiber link 400 is relatively noise-free, the electrical signal 462 output from the photodiode is representative of the original data signal 402. Signal detector processor 480 then accurately indicates that an optical data signal from link 400 is present when it detects an electrically modulated signal 462.

As shown in FIG. 4B, however, some optical faults can avoid detection due to optical noise introduced by optical amplifiers located downstream of a fiber fault. For example, when a fiber cut 425 prevents the output of laser 420 from propagating through fiber 422, there is no signal present at the input of optical amplifier 430. It is characteristic of such amplifiers to output a broad spectrum of noise or oscillations whenever there is no injected input signal. Therefore, the amplifier 430 will generate output light along fiber 432 despite the failure upstream at fiber 422. The photodiode 460 will transduce this noisy optical signal into an electrical signal 462. Absent sophisticated discrimination electronics, the signal detector 480 can potentially interpret the presence of the detected optical noise signal as an indication that optical data traffic is passing through the link.

Further, when the optical data signal is weak at the end of fiber link 400, the tapped fraction of the optical data signal is correspondingly weaker. Therefore, in some cases, the weaker tapped optical signal will not be detected even though the data optical signal is still recoverable resulting in a false alarm indication at output 482. Thus, the receiver 450 in the first embodiment is better suited for detecting strong optical data signals from a fiber link free of potential optical noise sources such as light amplifiers.

Second Embodiment

Figure 5:
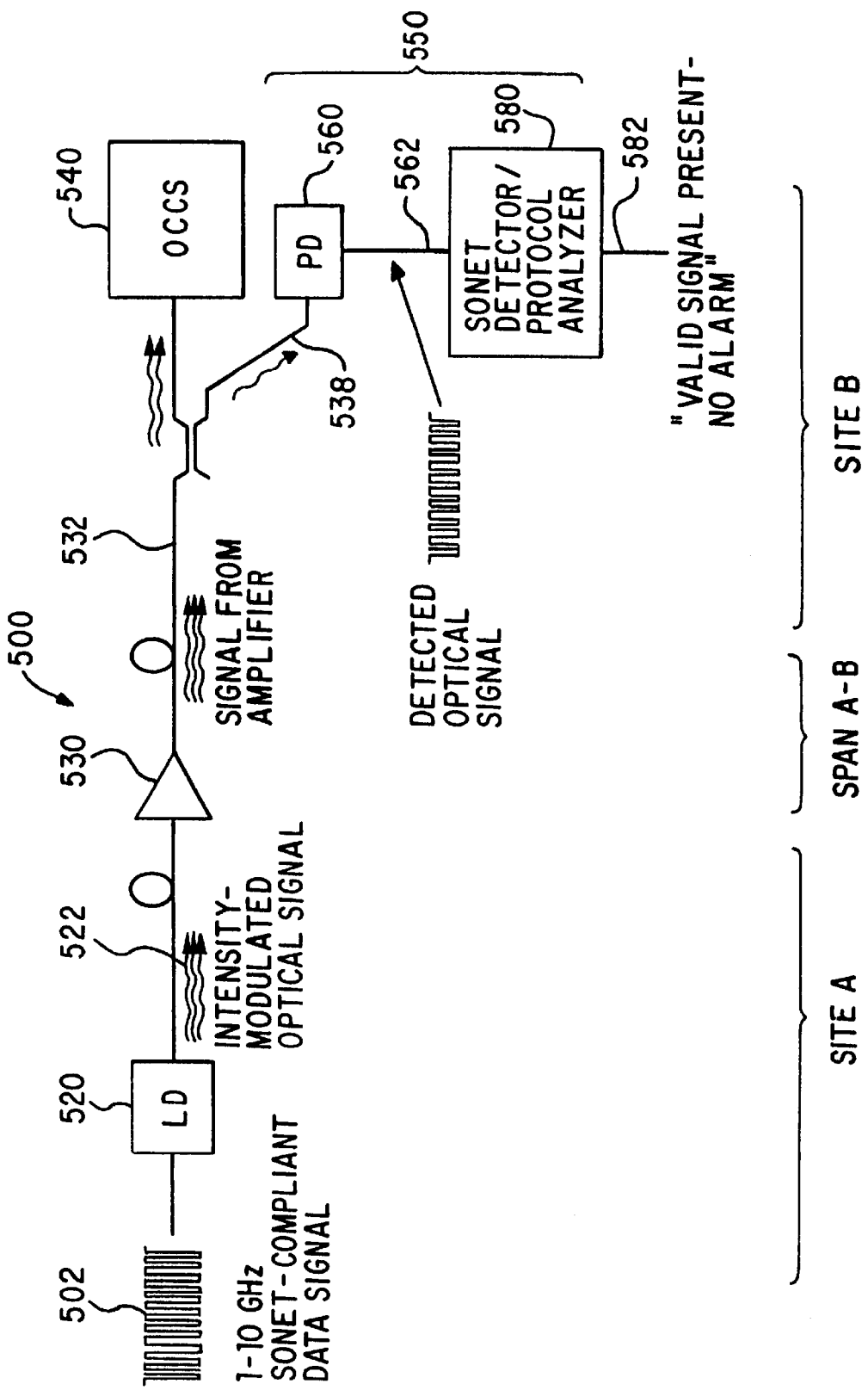
FIG. 5 is a block diagram of a fault detection technique using a protocol analyzer in accordance with a second embodiment of the present invention.

FIG. 5 is a block diagram of a fault detection technique using a more sophisticated receiver 550 having a protocol analyzer 580 in accordance with a second embodiment of the present invention. As indicated by the like-numbered reference numerals, the example embodiment of FIG. 5 differs from that described with respect to FIG. 4 only in the substitution of a more sophisticate protocol analyzer 580 for the signal detector 480.

A digital modulating signal 502 is input that complies with a specific standard protocol, for example, a SONET-compliant STS-48 signal. In general any digital data signaling protocol acceptable to an optical network can be used such as Optical Carrier signals, OC-1 to 192, as long as overhead bits and/or byte patterns can be recognized to verify the presence of a valid optical data signal. See, e.g., the high-level discussion of SONET overhead protocol in Digital Transmission Systems and Fiber Optic Technology and Transmission Systems in Minoli, D., "Telecommunications Technology Handbook," Artech House: Norwood, Mass.), chapter 3 (1995) (incorporated in its entirety by reference herein).

Laser diode 520 is modulated by this signal and propagates the optical signal through fiber 522, amplifier 530, and fiber 532 to eventually reach both the optical switch 540 and photodetector 560. The photodetector output signal 562 is fed to a SONET-compliant analyzer 580 that can determine whether predetermined alignment bits and/or byte patterns in the protocol overhead signals are present.

A protocol analyzer 580 such as a SONET detector, while more costly and complex than a simple thresholding detector, avoids the difficulties presented in FIG. 4B because the analyzer 580 can distinguish between an adherent data signal (properly formatted) and a spurious noise signal.

Third Embodiment

Figure 6A:
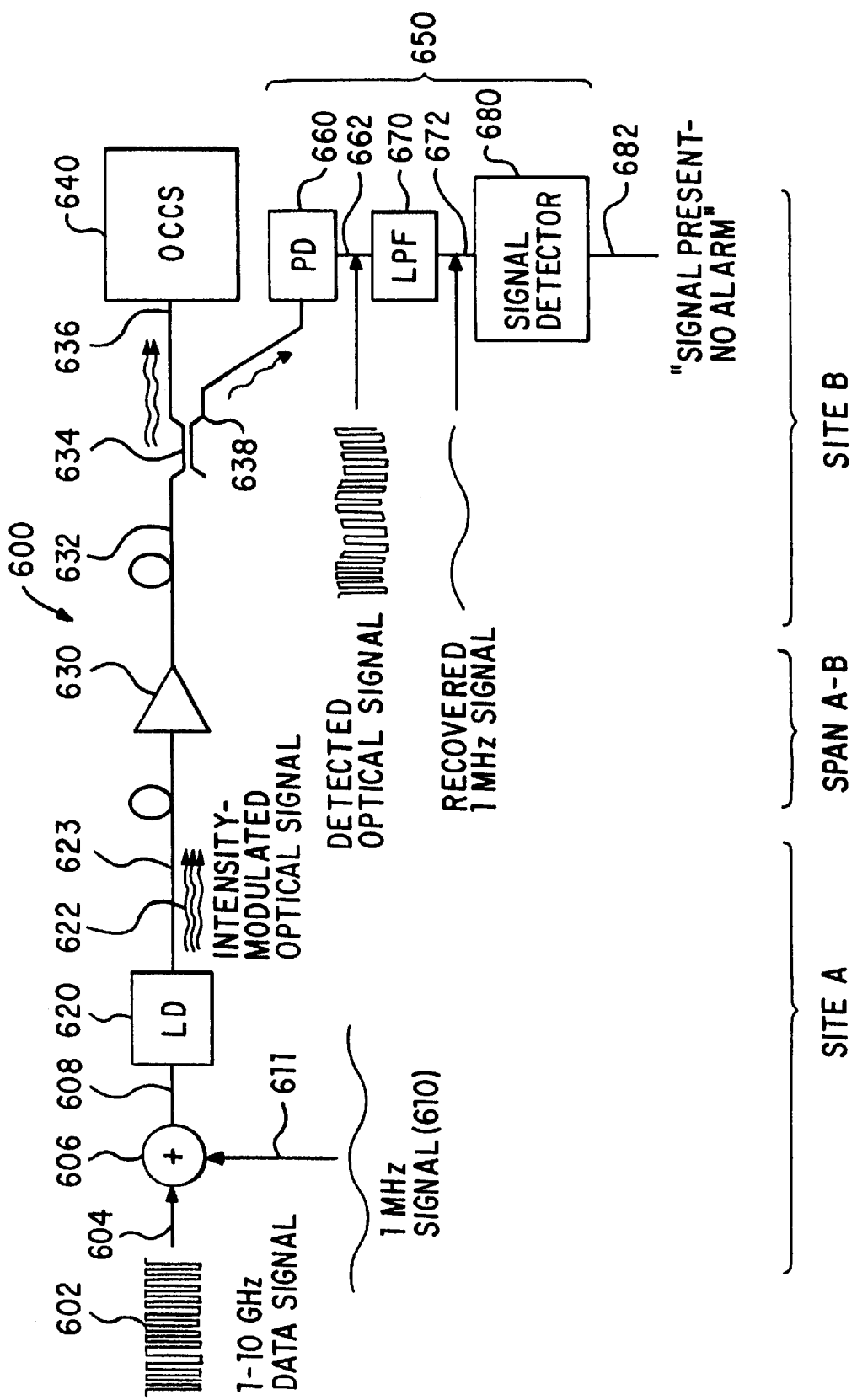
FIGS. 6A and 6B are block diagrams of a fault detection technique recovering a sub-carrier modulation signal in accordance with a third embodiment of the present invention.
Figure 6B:
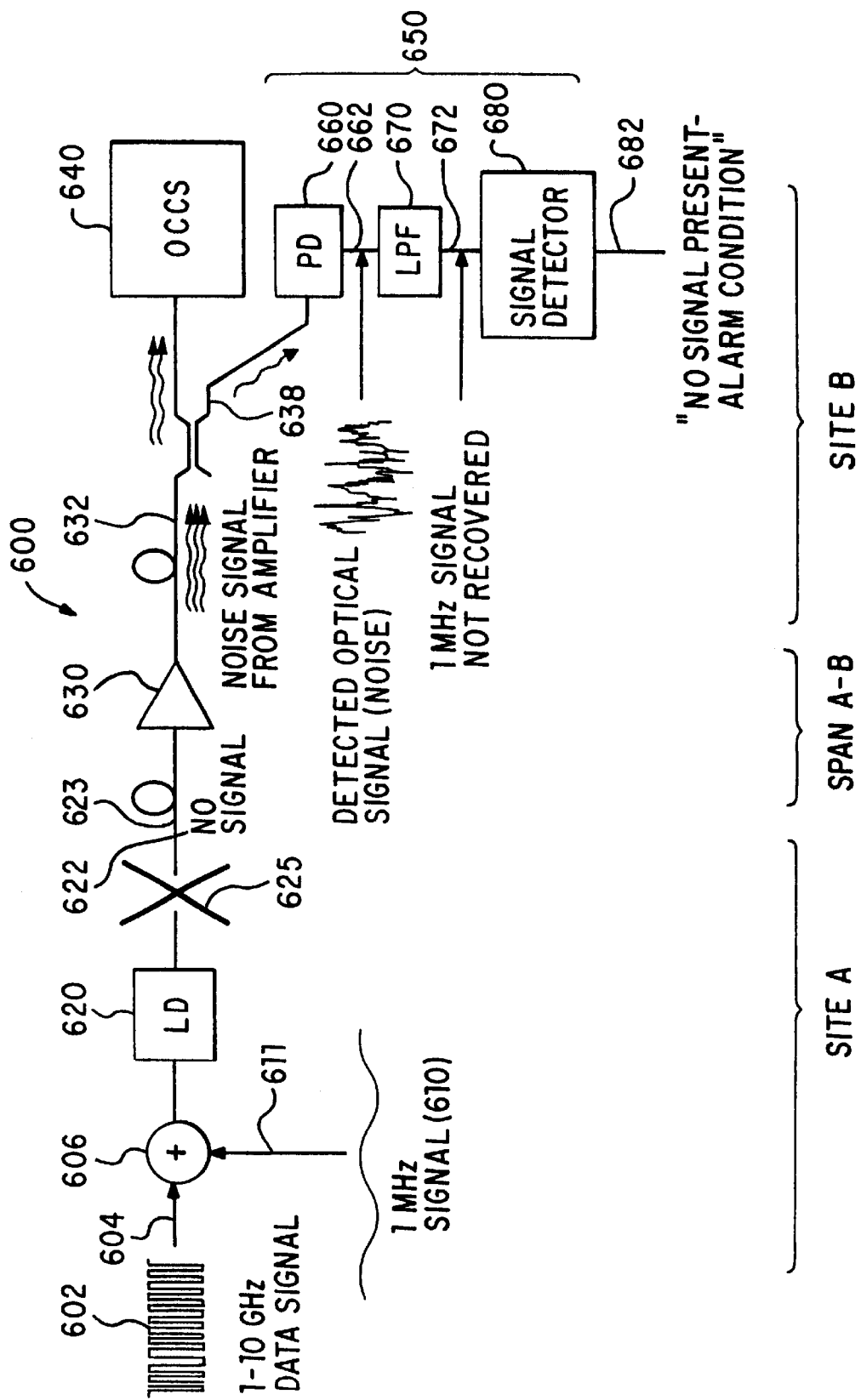

FIGS. 6A and 6B are block diagrams of a fault detection technique recovering a sub-carrier modulation signal or monitoring signal in accordance with a third embodiment of the present invention. A receiver 650 is provided which includes a photodiode 660, low-pass filter 670, and signal detector processor 680 for recovering the sub-carrier modulation to determine optical fault. FIG. 6A shows the detection of the presence or absence of a tapped sub-carrier modulated optical signal without noise. FIG. 6B shows the detection of the absence of a sub-carrier modulated optical signal despite the presence of noise.

With reference to FIG. 6A, a high data rate electrical signal 602 is presented at an input 604 to signal combiner 606. A monitoring subcarrier signal 610 is incident at a second input 611 to the combiner 606. The linear summation of signals 602 and 610 appear at the output of the combiner 608 and then this composite signal is used to intensity modulate laser diode 620.

The monitoring subcarrier signal 610 is of substantially lower frequency and amplitude than the main data signal 602. In a preferred embodiment, the frequency of the superimposed monitoring signal 610 is several orders of magnitude less than that of the data signal 602. For example, if data signal 602 is on the order of 1 to 10 GHz, i.e. a SONET-compliant STS-48 digital signal (approx. 2.5 Ghz.) or an Optical Carrier OC-192 signal (approx. 9.9 GHz.), a useful subcarrier signal 610 may range from 1 KHz to 10 MHZ, depending on the response bandwidth of photodetectors 660 used at the receiver 650. Further, the monitoring subcarrier signal 610 has a fraction, i.e. one-tenth, of the amplitude of the main data signal 602. Other ranges of amplitudes and frequencies for the sub-carrier modulation signal 610 and the main data signal 602 can be selected.

In FIG. 6A, the light output 622 of laser diode 620, modulated by the composite signal along input 608, propagates through fiber 623, amplifier 630, and fiber 632. The optical signal then enters coupler 634 and most of the light emerges along line 636 and enters the optical switch 640.

At coupler 634, a small portion of the light is diverted along fiber 638 and enters a photodetector 660. Because the intent of photodetector 660 is to recover the low frequency monitoring signal 610 from the optical signal, the photodetector 660 may be implemented using inexpensive photodiodes, phototransistors, or passive photoresistive devices. Although in FIG. 6A the output of the photodetector 662 shows a recovered main data signal entering a low-pass filter 670, the photodetector 660 and low pass filter 670 may be considered combined into a single unit when inexpensive, slow-responding optical detectors are used.

A replica 672 of the monitoring signal is recovered input to signal detector 680. This signal detector 680 may include a tone detector tuned to the subcarrier modulation frequency to selectively determine the presence of the monitoring signal 610 within the optical signal incident along fiber 632. The output 682 of the signal detector 680 represents a "Signal Present- No Alarm" when the monitoring subcarrier modulation signal 610 has been detected and recovered. Hardware and/or software can be used for implementing a low-pass filter 670 and signal detector processor 680.

FIG. 6B depicts the apparatus of FIG. 6A having suffered a fiber cut 625 along fiber 623. As described with respect to FIG. 4B, even though there is no light signal 622 along fiber 623, the optical amplifier 630 generates a noise signal so that light does propagate along fiber 632. This noise signal however does not satisfy constitute a regular modulated signal akin to the monitoring sub-carrier signal 610 and is not passed by the LPF 670. Signal detector 680 therefore detects the loss of the optical sub-carrier modulation signal and issues an alarm condition at output 682 indicating that "No Signal is Present."

Figure 7A:
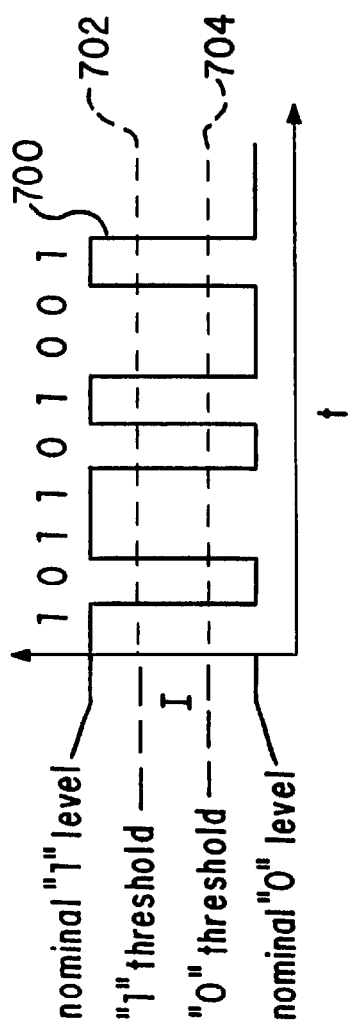
FIGS. 7A and 7B are time-axis graphs to illustrate a composite optical signal before and after the addition of a low-level subcarrier in accordance with the third embodiment of the present invention.
Figure 7B:
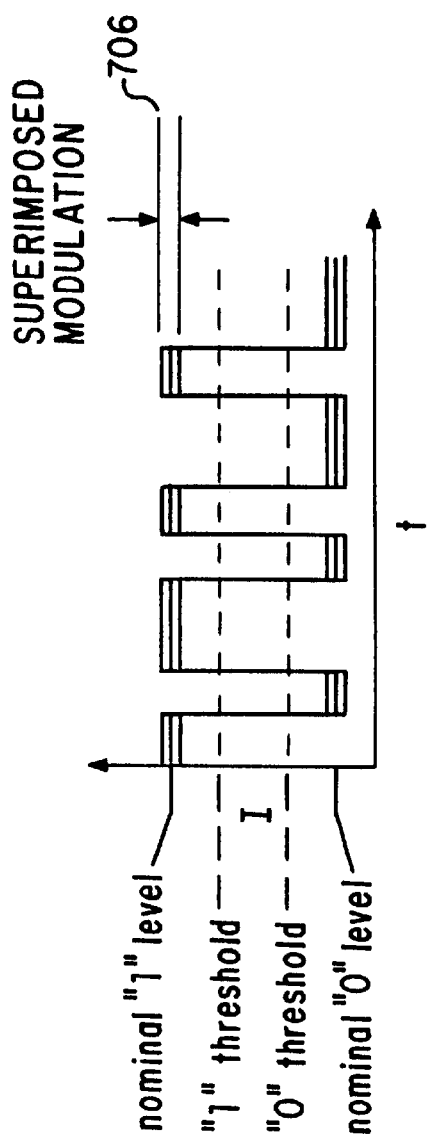

FIGS. 7A and 7B are time-axis graphs to illustrate a composite optical signal before and after the addition of a low-level subcarrier in accordance with the third embodiment of the present invention. FIG. 7A shows a time-axis plot of an idealized digital modulating signal 700 that might be present at input 604 of FIG. 6A. The detection thresholds 702 and 704 are juxtaposed to show that there is substantial margin to allow for reliable discernment of 1's and 0's.

FIG. 7B shows the effect of linearly adding a low-level subcarrier modulation 706 to the idealized digital modulation signal 700 in accordance with the present invention. The subcarrier modulation 706 appears as a slight amplitude jitter or drift within the main signal. The subcarrier effects are mild enough so that the high data rate 1's and 0's are still discernable by LTE at a receiving network site.

Figure 8C:
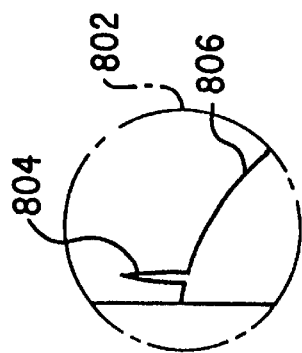
FIGS. 8A through 8C are frequency-domain graphs showing a composite optical signal with and without an added low-level subcarrier modulation in accordance with the third embodiment of the present invention.
Figure 8A:
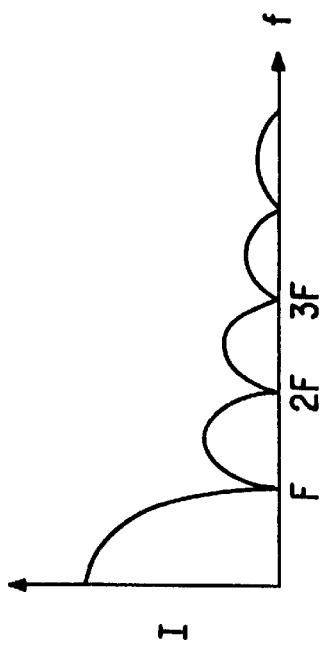
Figure 8B:
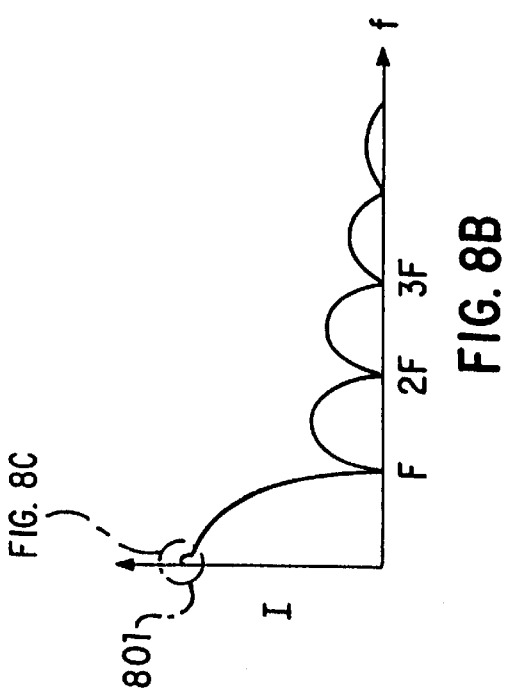

FIGS. 8A and 8B are frequency-domain graphs showing a composite optical signal with and without an added low-level subcarrier modulation in accordance with the third embodiment of the present invention. FIG. 8A shows a power spectrum of an non-return-to-zero NRZ-coded digital signal commonly used as a modulating signal such as signal 602. For example, a 1 Gbps NRZ signal will have a DC component as well as spectral nulls at multiples of 1 GHz.

FIG. 8B shows the power spectrum of anv NRZ-coded digital signal with an added low-level, low frequency sub-carrier in accordance with the present invention. Within the graphical area 801 that is shown magnified in inset 802, the added signal appears as a minor peak 804 at the low frequency end atop a much larger peak 806 contributed by the main data signal. This spectral plot shows that the superimposed subcarrier is readily distinguishable from the surrounding spectrum using, for example, a narrow bandwidth phase-locked loop tone detector as is well known to those skilled in the art.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for detecting an optical fault in a communication network, wherein the communication network includes first and second sites connected by a first fiber link carrying a modulated optical data signal between the first and second sites, the second site further including an intermediate optical cross-connect switch for optically coupling the modulated optical data signal between said first fiber link to a second fiber link, comprising the steps of:

coupling a portion of an optical signal from the first fiber link before the optical signal enters the optical cross-connect switch;

detecting said optical signal portion coupled from said first fiber link and generating a first electrical signal representative of said detected optical signal portion;

processing said first electrical signal to determine whether said detected optical signal portion represents the presence or absence of a portion of the modulated optical data signal traveling through the first fiber link; and indicating an optical fault condition when said processing step determines the modulated data output signal is not present.

2. The method according to claim 1, wherein said processing step comprises comparing the magnitude of the first electrical signal to a predetermined threshold.

3. The method according to claim 1, wherein said processing step comprises analyzing said first electrical signal to determine whether said detected optical signal portion has a protocol matching the modulated optical data signal.

4. The method according to claim 1, further including the step of adding a sub-carrier modulation signal to said optical modulation data signal.

5. The method according to claim 4, wherein said processing step comprises the steps of:

filtering said first electrical signal to substantially recover said sub-carrier modulation signal; and detecting the presence or absence of a recovered sub-carrier modulation signal after said filtering.

6. The method according to claim 1, further comprising the sep of switching said optical cross-connect switch in response to a fault indication to disconnect the first fiber link.

7. An apparatus for detecting an optical fault in a communication network, wherein the communication network includes first and second sites connected by a first fiber link carrying a modulated optical data signal between the first and second sites, the second site further including an intermediate optical cross-connect switch for optically coupling the modulated optical data signal between said first fiber link to a second fiber link, comprising:

an optical coupling means; and a receiver; wherein said optical coupling means couples a portion of an optical signal from the first fiber link before the optical signal enters the optical cross-connect switch to said receiver and wherein said receiver comprises:

detector means for detecting said optical signal portion coupled from said first fiber link and for generating a first electrical signal representative of said detected optical signal portion;

processor means connected to said detector means for processing said first electrical signal to determine whether said detected optical signal portion represents the presence or absence of a portion of the modulated optical data signal traveling through the first fiber link; and fault indicator means for indicating an optical fault condition when said processor means determines the modulated optical data signal is not present.

8. The apparatus according to claim 7, wherein said processor means comprises comparator means for comparing the magnitude of the first electrical signal to a predetermined threshold.

9. The apparatus according to claim 7, wherein said processor means comprises a protocol analyzer for analyzing said first electrical signal to determine whether said detected optical signal portion has a protocol matching the modulated optical data signal.

10. The apparatus according to claim 9, wherein said protocol analyzer comprises a SONET detector.

11. The apparatus according to claim 7, further comprising:

a sub-carrier modulation means for adding a sub-carrier modulation signal to said modulation data signal.

12. The apparatus according to claim 1, wherein said processor means comprises:

filter means for filtering said first electrical signal to substantially recover said sub-carrier modulation signal; and detector means for detecting the presence or absence of a recovered sub-carrier modulation signal after said filtering.

13. The apparatus according to claim 11, wherein said sub-carrier modulation signal has a frequency and amplitude lower than said optical modulation data signal.

14. The apparatus according to claim 11, further comprising:

a modulated laser source driven by a modulated data signal to produce the modulated optical data signal, wherein said sub-carrier modulation means linearly adds said sub-carrier modulation signal to said modulated data signal.

15. The apparatus according to claim 11, further comprising:

an externally-modulated laser source having an external modulator driven by a modulated data signal to produce the modulated optical data signal, wherein said sub-carrier modulation means linearly adds said sub-carrier modulation signal to said modulated data signal.

16. An apparatus for detecting an optical fault in a fiber link carrying a modulated optical data signal between first and second network sites, comprising:

a sub-carrier modulation means for adding a sub-carrier modulation signal to said modulated optical data signal;

an optical coupling means; and a receiver, said optical coupling means couples a portion of an optical signal from the fiber link to said receiver; wherein said receiver comprises:

photodetector means for detecting said optical signal portion coupled from said first fiber link and for generating a first electrical signal representative of said detected optical signal portion;

filter means for filtering said first electrical signal to substantially recover said sub-carrier modulation signal;

signal detector means for detecting the presence or absence of a recovered sub-carrier modulation signal after said filtering to determine whether said detected optical signal portion represents the presence or absence of the modulated optical data signal traveling through the first fiber link; and fault indicator means for indicating an optical fault condition when said signal detector means determines the modulated optical data signal is not present.

17. The apparatus of claim 16, wherein an optical fault condition represents either a link failure, fiber failure, cable cut, or nodal failure.

18. A method for detecting an optical fault in a communication network, wherein the communication network includes first and second sites connected by a first fiber link carrying a modulated optical data signal between the first and second sites, the second site further including an intermediate optical cross-connect switch for optically coupling the modulated optical data signal between the first fiber link and a second fiber link, comprising the steps of:

adding a sub-carrier modulation component to the modulated optical data signal, wherein the modulated optical data signal is propagated along the fiber link at an optical carrier wavelength, and wherein said sub-carrier modulation component propagates at substantially the same optical carrier wavelength as the modulated optical data signal;

coupling a portion of said modulated optical data signal from the first fiber link before the modulated optical data signal enters the optical cross-connect switch;

detecting said modulated optical data signal portion coupled from the first fiber link and generating a first electrical signal representative of said detected modulated optical data signal portion;

processing said first electrical signal, wherein said processing step includes filtering said first electrical signal to substantially recover said sub-carrier modulation component, and detecting the presence or absence of a recovered sub-carrier modulation component after said filtering; and indicating an optical fault condition when said processing step determines the modulated data output signal is not present.

19. The method according to according to claim 18, wherein said adding step comprises:

intensity modulating a semiconductor laser or amplifier with a composite driver signal, said composite driver signal comprising a high data rate component at a frequency of from about 1 gigahertz (GHz) to about 10 GHz, and a sub-carrier modulation component at a frequency of from about 1 kilohertz to about 10 megahertz, said sub-carrier modulation component having an amplitude of about less than 10% of an amplitude of said high data rate component.

20. The method according to claim 18, wherein said processing step comprises comparing the magnitude of said first electrical signal to a predetermined threshold.

21. The method according to claim 18, wherein said processing step comprises analyzing said first electrical signal to determine whether said detected modulated optical data signal portion has a protocol matching the modulated optical data signal.

22. The method according to claim 18, further comprising the step of switching the optical cross-connect switch in response to a fault indication to disconnect the first fiber link.

23. An apparatus for detecting an optical fault in a communication network, wherein the communication network includes first and second sites connected by a first fiber link carrying a modulated optical data signal between the first and second sites, the modulated optical data signal propagating along the fiber link at an optical carrier wavelength, and the second site further including an intermediate optical cross-connect switch for optically coupling the modulated optical data signal between the first fiber link and a second fiber link, comprising:

an optical coupling means; and a receiver; wherein said optical coupling means couples a portion of the modulated optical data signal from the first fiber link before the modulated optical data signal enters the optical cross-connect switch to said receiver, wherein the modulated optical data signal comprises a high data rate modulation component and a sub-carrier modulation component, each of said modulation components propagating at substantially the same optical carrier wavelength, and wherein said receiver comprises detector means for detecting said modulated optical data signal portion coupled from said first fiber link and for generating a first electrical signal representative of said detected optical signal portion;

processor means connected to said detector means for processing said first electrical signal to determine whether said detected modulated optical data signal portion represents the presence or absence of a portion of the modulated optical data signal traveling through the first fiber link; and fault indicator means for indicating an optical fault condition when said processor means determines the modulated optical data signal is not present.

24. The apparatus according to claim 23, wherein said processor means comprises comparator means for comparing the magnitude of the first electrical signal to a predetermined threshold.

25. The apparatus according to claim 23, wherein said processor means comprises a protocol analyzer for analyzing said first electrical signal to determine whether said detected optical signal portion has a protocol matching the modulated optical data signal.

26. The apparatus according to claim 25, wherein said protocol analyzer comprises a SONET detector.

27. The apparatus according to claim 23, further comprising:

a sub-carrier modulation means for adding a sub-carrier modulation component to the modulated optical data signal.

28. The apparatus according to claim 27, wherein said processor means comprises:

filter means for filtering said first electrical signal to substantially recover said sub-carrier modulation component; and detector means for detecting the presence or absence of a recovered sub-carrier modulation component after said filtering.

29. The apparatus according to claim 27, wherein said sub-carrier modulation component has a frequency and amplitude lower than the optical modulation data signal.

30. The apparatus according to claim 27, further comprising:

a modulated laser source driven by a modulated data signal to produce the modulated optical data signal, wherein said sub-carrier modulation means linearly adds said sub-carrier modulation component to the modulated optical data signal.

31. The apparatus according to claim 27, further comprising:

an externally-modulated laser source having an external modulator driven by a modulated data signal to produce the modulated optical data signal, wherein said sub-carrier modulation means linearly adds said sub-carrier modulation component to the modulated optical data signal.

32. An apparatus for detecting an optical fault in a fiber link carrying a modulated optical data signal between first and second network sites, the modulated optical data signal propagating along the fiber link at an optical carrier wavelength, comprising:

a sub-carrier modulation means for adding a sub-carrier modulation component to the modulated optical data signal, said sub-carrier modulation component propagating at substantially the same optical carrier wavelength;

an optical coupling means; and a receiver, wherein said optical coupling means couples a portion of the modulated optical data signal from the fiber link to said receiver; and wherein said receiver comprises:

photodetector means for detecting said optical signal portion coupled from said first fiber link and for generating a first electrical signal representative of said detected optical signal portion;

filter means for filtering said first electrical signal to substantially recover said sub-carrier modulation component;

signal detector means for detecting the presence or absence of a recovered sub-carrier modulation component after said filtering to determine whether said detected optical signal portion represents the presence or absence of the modulated optical data signal traveling through the first fiber link; and fault indicator means for indicating an optical fault condition when said signal detector means determines the modulated optical data signal is not present.

33. The apparatus of claim 32, wherein an optical fault condition represents either a link failure, fiber failure, cable cut, or nodal failure.

* * * * *